United States Patent [19]
Kott

[11] 3,780,300
[45] Dec. 18, 1973

[54] RADIATION SENSITIVE HIT DETECTION ARRANGEMENT

[75] Inventor: Michael A. Kott, Marlboro, Mass.

[73] Assignee: AAI Corporation, Cockeysville, Md.

[22] Filed: Jan. 12, 1972

[21] Appl. No.: 217,048

Related U.S. Application Data

[63] Continuation of Ser. No. 888,266, Dec. 29, 1969, abandoned.

[52] U.S. Cl. ............ 250/237 R, 250/203, 350/317
[51] Int. Cl. .............................................. G01j 1/20
[58] Field of Search .................. 250/203, 229, 226, 250/237 R, 237 G; 350/162 SF, 205, 214, 235, 317, 311; 356/4

[56] References Cited
UNITED STATES PATENTS

| | | | |
|---|---|---|---|
| 3,551,680 | 12/1970 | Knight | 250/203 X |
| 3,419,726 | 12/1968 | Olsen | 250/239 X |
| 2,244,507 | 6/1941 | Thomas | 350/314 X |
| 3,001,437 | 9/1961 | Taylor | 250/203 X |
| 3,035,479 | 5/1962 | Baltosser et al. | 250/226 X |
| 3,041,011 | 6/1962 | Dhanes | 250/203 X |
| 3,060,360 | 10/1962 | Tomek | 250/229 X |
| 3,260,152 | 7/1966 | Aston | 350/314 X |

*Primary Examiner*—Walter Stolwein
*Attorney*—Reginald F. Pippin, Jr.

[57] ABSTRACT

A hit detecting and indicating arrangement for a target having a light source thereon, in which the hit detection and indicating arrangement includes a light sensitive detection element with a digital gray scale filter for attenuating the light energy from the target light source as a generally inverse square function of the distance of the photoscope from the light source. The photoscope includes a lens system and a field mask, the field mask having a generally triangular field aperture which defines the maximum area of light transmission through the digital filter.

38 Claims, 6 Drawing Figures

RADIATION SENSITIVE HIT DETECTION ARRANGEMENT

This is a continuation, of application Ser. No. 888,266 filed Dec. 29, 1969, now abandoned.

This invention relates to a hit detecting and indicating arrangement including a photoscope or other analogous signal detecting device having the capability of detecting and indicating the occurrence of hits upon a movable target which has a light source detectable by the photoscope, and which may be located at varying distances from the photoscope.

In hit detection systems for simulating the occurrence of hits scored by the operator of a weapon or simulated weapon, it is desirable to be able to detect the occurrence of hits over as wide a range of target distance as possible. Various arrangements have been proposed and employed to effect some degree of capability in this respect, including the employment of photodiodes which are variable in response across their lateral surface, the employment of filter masks between the detector and the light source, and the employment of dual detectors with dual lens systems. The present invention enables the employment of a single detector, such as a photodiode, while enabling the detection of hits over a relatively wide range of distances of the target from the detecting and indicating device, (although such may be employed in dual detector-lens systems, if desired, for even greater range), and further enables this function to be obtained without the necessity for a large diode or a special diode with special configuration and/or response.

In carrying out this invention a special analog simulating digital filter mask is employed in the hit detecting and indicating device, between the target signal detecting element (which may be and is preferably a photodiode) and the target. This special filter mask may theoretically be a digital filter mask in entirety, but as a practical necessity is a combined analog and digital filter mask. The degree of combination of the digital and analog filter portions of the mask is generally a practical matter, depending to a substantial degree upon the materials and techniques employed in forming the mask. The general function of the mask is to enable the detecting and indicating system to accommodate the normal target signal attenuation which occurs proportionately to the square of the distance of the target from the detecting device, while enabling the detection and indication of hits within a varying aiming angle as an inverse function of the target distance from the detecting device.

Still other objects, features and attendant advantages will be obvious to those skilled in the art from a reading of the following detailed description of a preferred embodiment constructed according to the invention, taken in conjunction with the accompanying drawings wherein.

Figure 1:
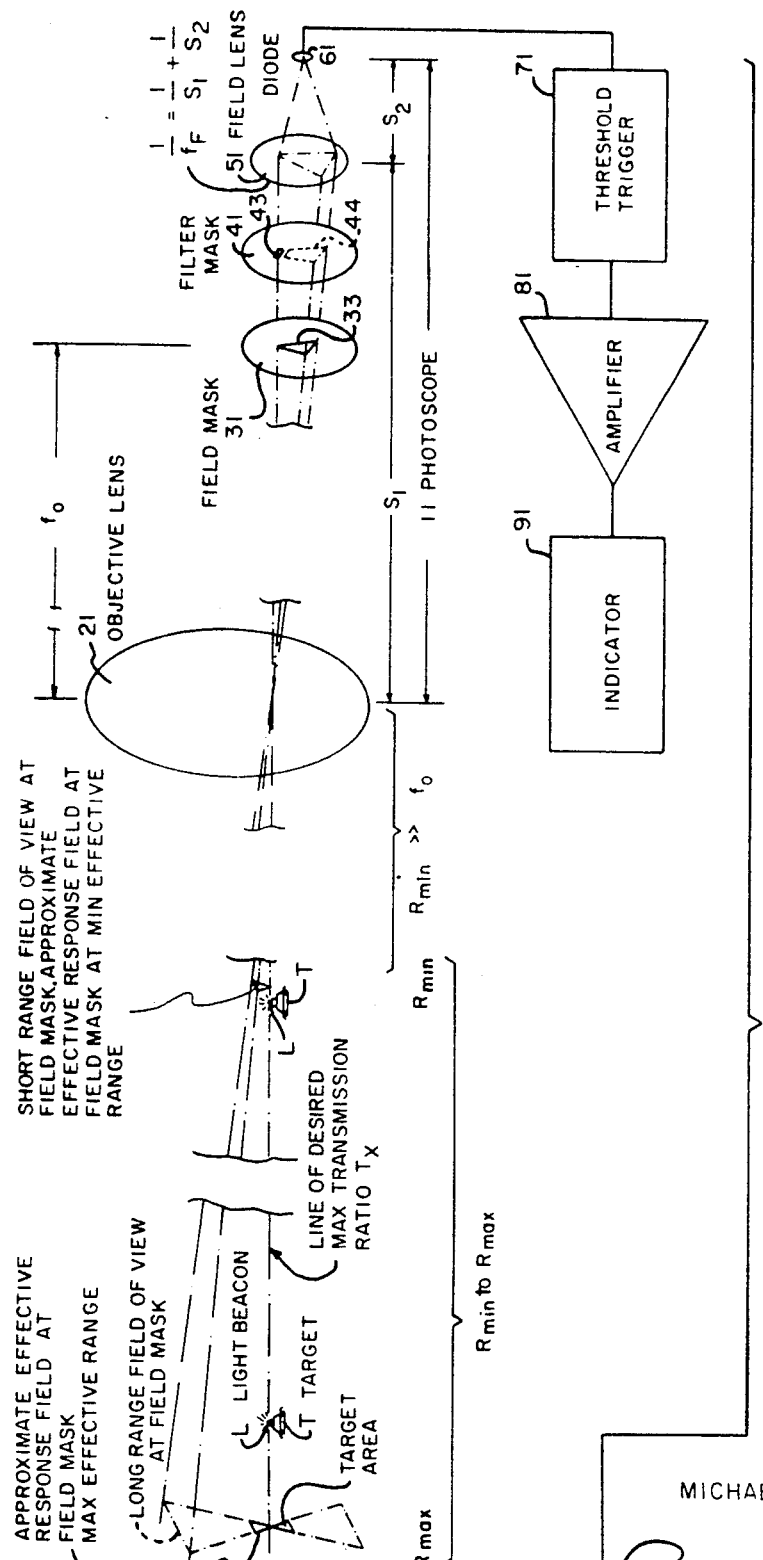
FIG. 1 is a schematic illustration of a hit detecting and indicating arrangement and incorporating the novel combination filter according to the invention.
Figure 2:
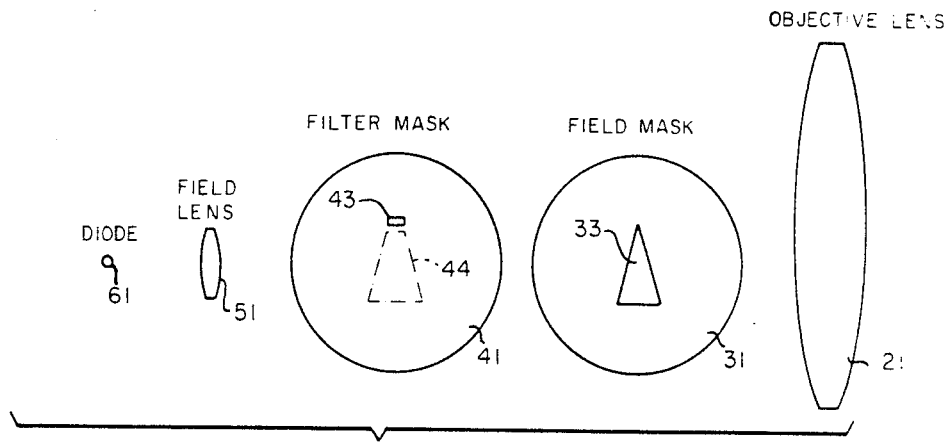
FIG. 2 is a schematic view of the basic elements of the hit detecting arrangement of FIG. 1, and illustrating schematically the relative sizes of these elements.
Figure 3:
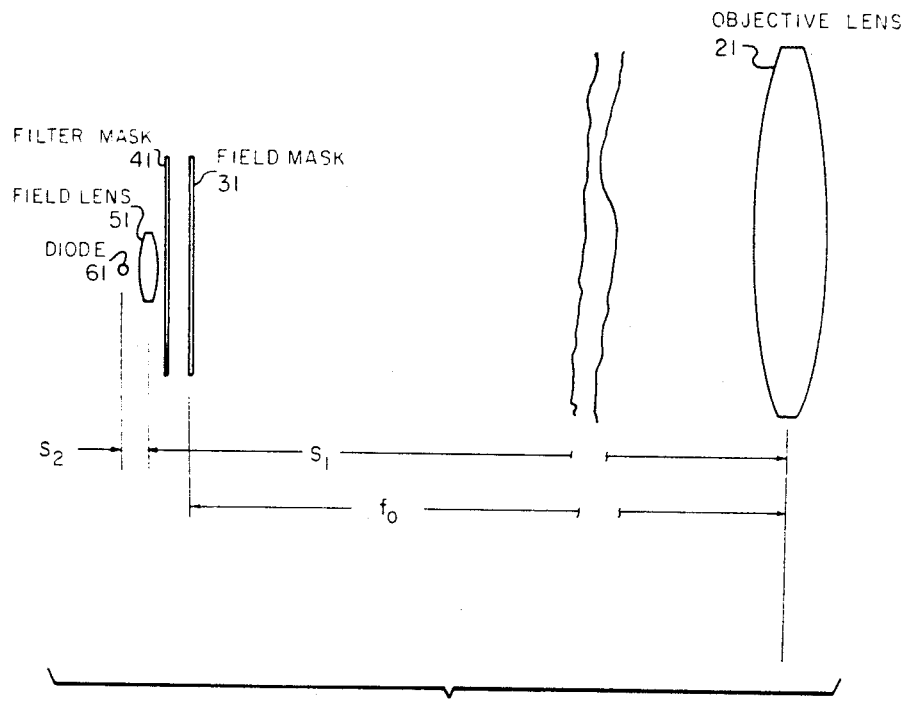
FIG. 3 is a schematic illustration of the elements of FIG. 2, illustrating the relative axial distance spacing thereof.
Figure 4:
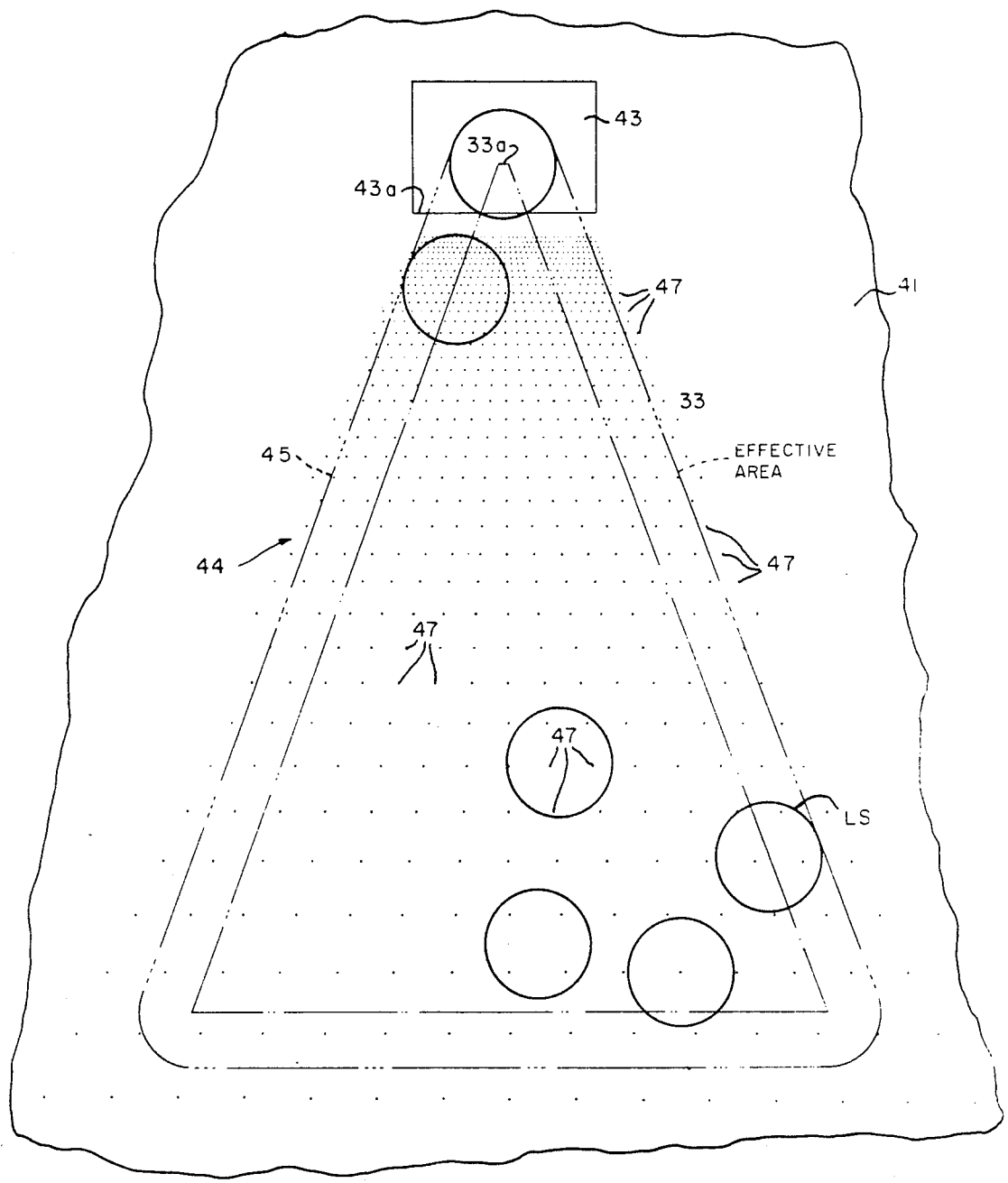
FIG. 4 is a fragmentary greatly enlarged face view of the novel filter mask according to the invention, and illustrating various light spot pattern and position aspects with respect thereto.

Referring now in detail to the figures in the drawing, a photoscope generally indicated at 11 is provided for detecting the ability of an operator to aim the photoscope at a target T, such as a tank vehicle, which is provided with a detectable target signal generating means, such as a light beacon L. The light beacon L may generate a light beam which is in the visible or invisible spectrum, as may be desired, and which is detectable by the photoscope when properly aimed thereat, as will be later described. The light beacon L may be continuously generating its light beam, or may be triggered to generate such by the operator of the photoscope, as through the employment of a further signal and response system, which does not itself form a part of the present invention, and which may be of a type such as disclosed in U.S. Pat. Nos. 3,104,478 and 3,169,191.

It is desired that the photoscope 11 be capable of detecting simulated hits on the target T over a substantial range of distances of the target T from the photoscope 11. As the light beacon L is normally of constant intensity, it will be apparent that the light reaching the photoscope will vary generally inversely to the square of the distance of the target T from the photoscope, and in addition there are atmospheric attenuations which it may be desirable to accommodate for given situations. The primary variation of amplitude of the light signal reaching the photoscope 11 from the target T and its light beacon L is caused by the inverse square variation as a function of range of the target, and this invention is primarily directed toward accommodating this variation, although it will be appreciated that other variations may be generally accommodated, within limits, by the invention.

The photoscope 11 includes an assembly of elements which may be suitably housed within a tubular or other housing, which is not shown, as such itself does not form a part of this invention and may be readily formed by one skilled in the art. The primary elements of the photoscope 11 are an objective lens 21 which collects light from the light beacon L, a field mask 31, a filter mask 41, field lens 51 and photodiode 61. The objective lens 21 and the field lens 51 may each suitably be convex-convex, and the spacing of the elements 21–61 of the photoscope 11 is such with respect to the objective and field lenses that the focal length $f_o$ of the objective lens is equal to the center-to-center distance between the objective lens and the field mask 31, with the focal length $f_f$ of the field lens being defined by the following equation:

$$1/f_f = 1/S_1 + 1/S_2$$

where $S_1$ is the center-to-center distance between the objective lens 21 and the field lens 51, and $S_2$ is the distance between the center plane of the field lens 51 and the detecting face of the photodiode 61.

Thus, the light collected by the objective lens 21 will be focused at the plane of the thin (e.g. 0.001 in.) field mask 31, and this circular pattern of light will converge to its smallest substantially point size at the field mask 31. The light beam diverges and is enlarged as it passes rearwardly away from the field mask 31, and has a discrete generally circular spot size S at the plane of the filter mask 41. For purposes of discussion hereinafter, this light beam spot at the plane of the filter mask 41 will be designated as LS, and, as noted, such spot LS will have a finite size S, which is a function of the focal length spacing $f_o$ between objective lens 21 and field mask 31, the diameter of lens 21, and the spacing between field mask 31 and filter mask 41. For a given objective lens focal length $f_o$ and corresponding interspacing between the objective lens 21 and field mask 31, the filter mask 41 may be spaced rearwardly of the field mask 31 to achieve a desired size S for the light spot LS from the target light beacon L.

Connected to the output of the photodiode 61 is a threshold trigger 71 which may suitably be a Schmitt trigger circuit, which in turn is connected to an amplifier 81 and indicator 91. The threshold trigger circuit 71 may suitably be selectively set to enable the indication of the presence of hits detected by the photoscope 11 as indicated by the presence at the diode 61 of at least a given selected minimum quantum of light energy on the effective surface of the diode 61 after passing through the photoscope 11. This setting may readily be made on an empirical trial basis, if desired.

In the photoscope 11, the field lens 51 accepts all light energy reaching such and which has passed through the assembly of the objective lens 21, field mask 31 and filter mask 41, and images this collected, masked and filtered light from the objective lens onto the face of the diode 61. In this manner the diode 61 may be made relatively small as compared to what would otherwise be required without the employment of the field lens 51.

The light collected by the objective lens 21 is masked and filtered by the field mask 31 and filter mask 41 respectively, prior to passing through the field lens 51 and being imaged onto the diode 61. The field mask 31 has a triangular aperture 33 formed therein, and generally aligned with this triangular aperture 33 is a digital-analog filter section 43, 45 on the filter mask 41. The triangular aperture 33, taken in conjunction with the focal length of the objective lens 21 and the spacing of the filter mask 41 from the field mask 31, defines the maximum overall field of view as such appears at the filter mask 41. As is generally schematically illustrated in FIG. 1, the physical dimensional triangular field of view through the field mask 31 is directly proportional to the range of a target from the photoscope 11. It will be appreciated that inasmuch as the target T is of constant size, such increasing physical dimensional field of view effected by the field mask 31 would itself alone result in a variable error in hit indication at all ranges other than some given single range, the degree of error being a function of the actual range relative to this given range. The desired effectively detected field of view through the field mask should be substantially constant for all ranges, over the working scope of target ranges, and the general configuration of the triangular aperture 33 should generally conform to the acceptable hit pattern over the given target T, this triangle being effectively inverted in form as indicated in FIG. 1 at the zone of the target, to thereby define the maximum zone within which the light beacon L may be located while still enabling the registry of a hit by the diode 61, threshold trigger 71, amplifier 81 and indicator 91.

The field of view at the field mask is modified to form the effectively detected, or effective, field of view therethrough, by the incorporation of filter 41, by which the quantum of light energy within the light spot LS is attenuated generally as a function of the displacement of the light spot LS downwardly from the apex of the triangular aperture 33. For inverse square light attenuation compensation, this variation in attenuation is desirably directly proportional to the square of the x-axis displacement of the center of the spot LS from its base or origin point which latter point is the point of focus of the light beam at the precise upper apex of the triangular aperture 33 in field mask 31. This will yield a transmission ratio through the filter mask 41 which would vary inversely as the square of the displacement of the center of the spot LS from its zero position. This theoretical zero position may, if desired, correspond to the actual position of the light spot LS when the photoscope is precisely axially aligned with the target light beacon L or the theoretical zero position may be offset upwardly if desired or necessary in a given instance. It will be appreciated that by employing such a variable transmission ratio through the filter mask 41, this enables accommodation of the variation in light received by the objective lens 21 as an inverse square function of the range of the target T from the lens 21, as the approximate effective triangular aperture portion of the field mask aperture 33 may thus be proportionately decreased inversely proportional to increase in range of the target T, and directly proportional to angular change in angular field of view of the target T, as generally indicated at positions $R_{min}$ and $R_{max}$ in the schematic illustration of FIG. 1.

The effective working zone at the field mask or the filter mask may be defined as the zone over which the target light source L may be imaged at the field mask, or the filter mask respectively, and yield transmitted light spot energy from the target light beacon L through the filter mask and field lens to the diode, which transmitted energy value is above that which would enable the diode to trigger the trigger circuit for a given threshold setting for the trigger circuit.

It is theoretically possible to employ a direct analog photo-emulsion mask of varying transmission density for the filter mask 41 in order to achieve this result, although in actual practice such is quite difficult and expensive to carry out on a uniform or reliable basis, and such a photoemulsion filter also normally has the substantial disadvantage of changing with the passage of time, as is characteristic of developed film emulsions. Thus, although the photographic filter mask 41 with smoothly varying density and transmission ratio is theoretically feasible and in this respect theoretically most desirable according to the broad aspects of the invention, such is in actual practice difficult to achieve. I have found that a practically suitable filter mask 41 can be formed in a substantially different and practically satisfactory manner, and which may from a generally practical standpoint sufficiently approximate the desired transmission ratio curve $T_x$, where $$T_x = K\ 1/x^2.$$

in which x is a function of the displacement of the light spot LS from its base or origin point, and K is a constant multiple. The filter section of mask 41 is generally indicated at 43, 44, 45, and is formed by a relatively large light passing aperture 43 having an edge 43a which forms an optical knife edge, and a plurality of sets of relatively much smaller apertures or holes 47 which may be, and are desirably from a practical standpoint, of constant diameter and which vary in spacing therebetween as a function of the distance $x$ of succeeding rows of such holes from a zero point or line corresponding to the position of the spot LS at the point of tangency of the spot LS with the knife edge 43a. The formation of the holes 47 may be readily achieved in the middle and lower zones of the hole section 44, but it will readily be appreciated that if physical holes are to be physically formed in a sheet of material, which is the preferred manner of formation and construction, there is normally a practical limit beneath which it becomes extremely difficult, if not practically impossible, to consistently form substantially uniform holes 47 in the sheet forming the filter 41. From a practical standpoint in relatively thin sheets (e.g. 0.001 inch) this has been determined to be approximately that spacing where the minimum center-to-center distance $G_{x_{min}}$ between holes is equal to 2H, where H is the diameter of the holes in the section 44, and $G_x$ is the center-to-center spacing between adjacent holes generally. Thus, in the zone of the projected apex of field mask triangular aperture 33, the employment of holes 47 in the filter mask 41 reaches a practical impossibility when such are physically formed in the desired structural hole method and construction. In the case where a photographic emulsion density method is employed for formation of these light passing (or blocking or attenuating, in such case) apertures 47 on a substate such as plastic, glass or the like, with the remaining surrounding zone being uniformly opaque or of other substantially different optical transmissivity, it will be appreciated that, dependent upon grain size of the developed emulsion, the mask 41 may be formed with such photographic apertures 47 disposed even closer together, and accordingly with a very fine grain emulsion one might conceivably have such apertures 47 extend substantially to the upper apex position of the spot LS as it passes through the apex of triangular aperture 33 and onto the filter mask 41. Such is within the contemplated extent of my invention, but as before mentioned, such is normally not preferred, particularly in view of the practical difficulties encountered in photographic emulsions changing their density and transmission characteristics over a period of time.

A suitable practical solution to this difficulty has been achieved by employing a knife edge signal attenuation transition zone in the zone above the upper row of holes 47 which are at the minimum interhole spacing 2H. It has been found that the combination of transmission ratio curves as the spot LS is displaced axially from its zero point indicated in FIG. 5 at $x_0$ where the spot is tangential to the knife edge 43a of large aperture 43, downwardly along the x axis and onto and along the digital hole section 44, may be made to generally approximate for practical purposes the desired transmission ratio curve $T_x$ for a given range of target distances $R_{min} - R_{max}$.

As the light from target beacon L passes through its focal point in plane of triangular apertured field mask 31, and subsequently converges to form a spot LS in the plane of digital mask 41, it will be appreciated that the total effective light transmission area of the filter mask 41 will be determined by the size of triangular aperture 33, the spacing of this mask 31 and mask 41, the diameter of lens 21, and the focal length $f_o$, and for a given size S of spot LS, the effective area of filtering of signals from the target T may be indicated by the broken line 44 which extends beyond the directly superimposed outline of the triangular aperture 33, by an amount equal to S/2. Thus, the zone over which the holes 47 are formed is desirably larger than the effective filter area outline pattern 45 by a small amount sufficient to provide desired hole spacing within the effective filter pattern area 45.

Figure 5:
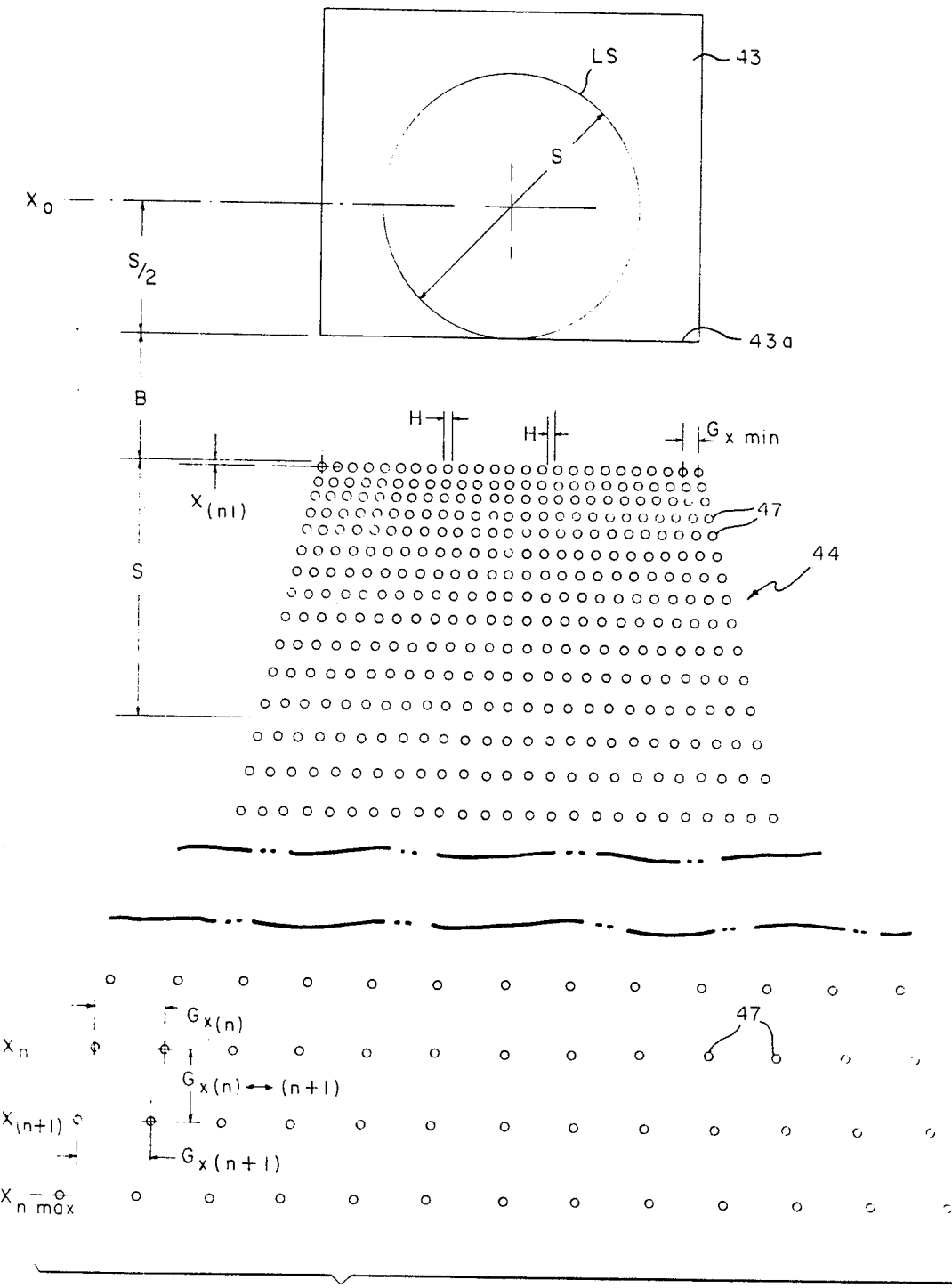
FIG. 5 is a more greatly enlarged schematic illustration of the hole area forming the filter section of the filter mask of the preceeding figures, the relative size of the small digital holes being exaggerated for clarity of illustration.

Taking the transmission ratio curve $T_1$ which results from displacement of the light spot LS from point zero, designated in FIG. 5 as $x_0$, vertically downwardly along the space in the zone from $x = 0$ to $x = S$, at which lateral position the light spot LS is completely beneath the knife edge 43a, and ignoring the light transmission through the digital hole section 44, the transmission ratio $T_1$ for this zone of spot travel may be defined as $$T_1 = 1/\pi \ (\pi - \text{arc cos } S - 2x/S + \tfrac{1}{2} \sin 2 \text{ arc cos } S - 2x/S)$$

and this equation being applied for values of $x$ from $x = 0$ to $x = S$, only.

Figure 6:
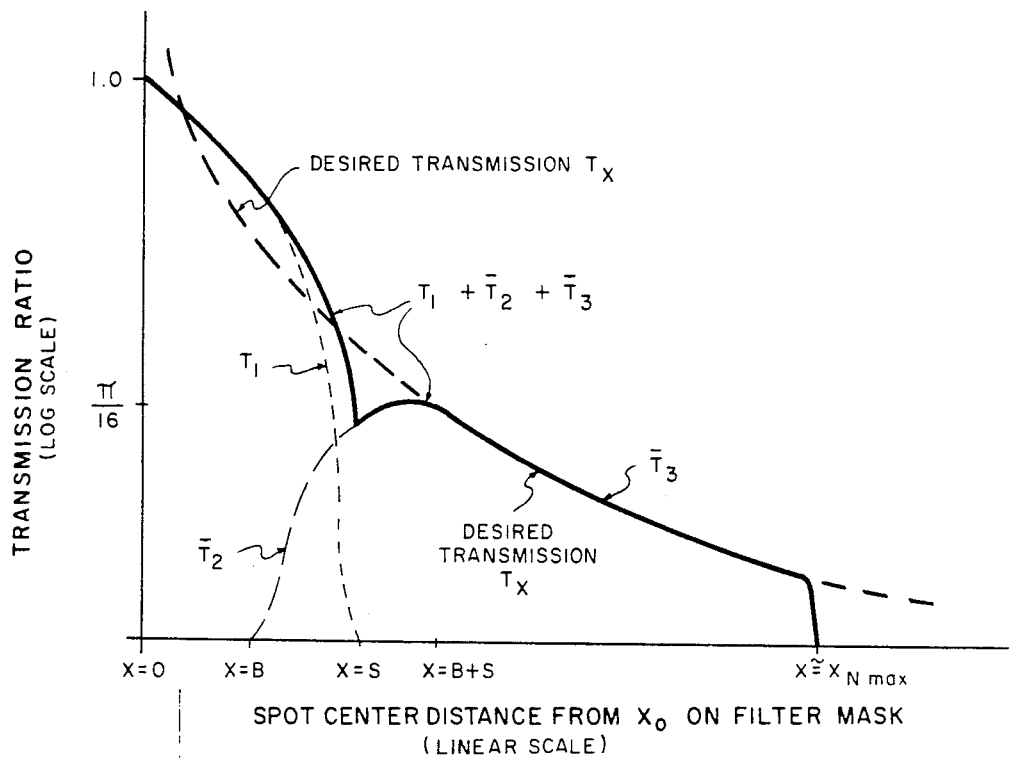
FIG. 6 is a generalized diagram illustrating various transmission curves with respect to the filter mask according to the invention.

Considering next the average transmission ratios $\overline{T_2}$ and $\overline{T_3}$ as the light spot LS is traversed along the x axis over the digital hole filter section 44, the following assumptions and practices have been found to be practical in order to provide a combined curve $T_1 + \overline{T_2} + \overline{T_3}$ which generally approximates the desired transmission curve $T_x$, which latter curve $T_x$ is generally illustrated in FIG. 6 in broken line and is so indicated.

These assumptions include:

$G_{x_n}$ = center-to-center hole spacing along the Y axis for any given row of holes at a distance $x_n$ from point or line $x_0$, line $x_0$ being the X axis location at the center of spot LS when the lower edge of the spot is tangential to the knife edge 43a of aperture 43.

$G_{x_{min}} = G_x$ = minimum center-to-center hole spacing of row of holes 47 nearest knife edge, at distance $x_1$ from line 0.

$G_{x_{max}} = G_{x_{n_{max}}}$ where $G_{x_{n_{max}}}$ is the last line of holes furtherest spaced from the knife edge 43a, and represents the greatest interhole spacing for a given digital hole filter zone 44, independent of other cutoff values which may be effected by the field cutoff boundary of field aperture 33.

$H$ = hole diameter for all holes 47.

$G_{min} \approx 2H$ as a practical lower limit.

$S$ = diameter of light spot LS $x_{n_{max}} >> S >> H$

For practical purposes the filter mask 41 is formed of thin metal (e.g. 0.001 inch thickness) which is opaque, thus rendering the transmission ratio of filter mask 41 equal to zero at all zones other than hole zones formed by holes 43 and 47, and within such holes the transmission through any given hole area is assumed to be unity. It will be appreciated that both of these extremes may be modified respectively by using different transmission density material for the sheet forming mask 41, and lesser than 100 percent transmission through the island zones of hole 43 and/or 47, as with a purely developed emulsion film mask 41. For purposes of approximating the average transmission value $\bar{T}_x$ a generalized equation may be derived, based on the assumption that interhole spacing G in both the X and Y directions approximates a square of substantially uniform size over the circumferential zone of the spot LS.

It will be seen that for a matrix of holes with such a uniformly equal square inter-hole spacing of the holes $$\bar{T} = \pi H^2/4\ G^2$$

the value $\bar{T}$ being the average transmission ratio through the gridwork of holes in an opaque sheet, the size of the error of $\bar{T}$ being inversely proportional to the value of $(S - H)$ and directly proportional to G.

This theoretical gridwork is not found in the desired digital filter zone 44 having holes 47 therein, as the interhole spacing is varied as a function of the distance of a given line of holes from line $x_o$ in order to approximate the desired inverse square light transmission compensation. However, for relatively large values of S with respect to H and G, with relatively small changes of G with respect to itself from line to line, it will be appreciated that this approximation equation $\bar{T}$ may be applied advantageously to the gridwork of holes according to the present invention, it being recognized that the greater the value of G the larger will be the possible error in the value $\bar{T}$, for any given value of S as the diameter of the spot LS. Based on this assumption, for a given transmission $\bar{T}_{x_n}$ in the zone of the row of holes at $x_n$ distance from line or point $x_o$, an approximation value for $\bar{T}_{x_n}$ may be derived as $$\bar{T}_{x_n} \cong \frac{\pi H^2}{4(G_{x_n})^2}$$

Correspondingly, $$G_{x_n} \cong \sqrt{\frac{\pi H^2}{4\bar{T}_{x_n}}}$$

where $G_{x_n}$ is the center-to-center hole spacing along the Y axis at the row of holes $x_n$ distance from $x_o$. Thus, given the desired transmission ratio $T_x$ for a given line position $x_n$ on the mask 41, and assuming $T_x \approx \bar{T}_{x_n}$ at the light zone involved, it will be seen that the interhole spacing $G_x$ may be derived for the particular line position $x_n$.

The inter-row spacing of adjacent rows of holes along the X axis may be determined in various ways, as desired, the simplest method being to obtain first the Y axis value (i.e., $G_{x_{n_1}}$) of $G_x$ for the row of holes closest to the knife edge 43a, which value may be generally determined for any given hole size, from the foregoing practical assumptions. For this purpose, the value $\bar{T}_{x_{n_1}}$ is selected to that value which will complement another curve $\bar{T}_2$ to be subsequently described in more detail hereinafter, for the given selected distance $x_{n_1}$, the value $x_{n_1}$ of which will likewise be selected on a trial and error basis with this view in mind.

After arriving at the value $G_{x_{n_1}}$, one acceptable and simple method of arriving at the x distance spacing of the next succeeding line of holes, where $G_{x_{n \rightarrow (n+1)}}$ for any two successive rows represents this inter-row spacing for any two successive rows where the rows are at $x_n$ and $x_{n_1}$ distance from $x_0$, is to make $G_{x_{n \rightarrow (n+1)}}$ equal to the value of $G_{x_n}$. Thus, once the x location of the first line of holes is established, all succeeding lines may be readily located.

Alternatively, the inter-row spacing $G_{x_{n \rightarrow (n+1)}}$ may be increased as a function of the interhole spacing $G_{x_n}$ and $G_{x_{(n+1)}}$ for the respective two adjacent rows of holes. In this respect, this interrow spacing may be made approximately equal to the average of the values $G_{x_n}$ and $G_{x_{(n+1)}}$ for the respective two adjacent rows of holes, and which may be written as $$G_{x_{n \rightarrow (n+1)}} \cong \frac{G_{x_n} + G_{x_{(n+1)}}}{2}$$

If this latter relationship is assumed, rather than the simpler former relationship of $$G_{x_{n \rightarrow (n+1)}} = G_{x_n}$$

it will be appreciated that repeated trial and error calculations may be employed to determine the desired values of $G_{x_{n \rightarrow (n+1)}}$ for succeeding rows, as this inter-row value will be dependent upon both values $G_{x_n}$ and $G_{x_{(n+1)}}$ for succeeding rows of holes, by definition, and these values are in turn dependent on the x distance location of the respective rows of holes 47 from $x_o$. This particular manner of incremental variation of $G_{x_{n \rightarrow (n+1)}}$ best lends itself to solution by computer programming, particularly in view of the requisite trial and error method of solution, although it will be apparent that such may be derived by repeated hand calculations on a trial and error basis in order to get a desired degree of approximation of the desired curve $G_x$.

These assumptions further include the assumption that in the zone between the first row of holes 47 lying closest to the knife edge 43a, and extending over an x distance of S, the holes may be assumed to be generally equally spaced from a generally practical approximation standpoint, although in fact the holes are disposed with increasing spacing over this zone, and the resulting curve $\bar{T}_2$ in this area in fact assumes a lesser transmission ratio amplitude and curve slope as x approaches the value of $B + H$, than is otherwise shown by the assumed approximation. However, from a pratical standpoint this is not a serious deficiency, as the entire curve is itself only an approximation, and this degree of error may as a practical matter be acceptable in various instances. This assumption for the purpose of deriving the transmission ratio curve $\bar{T}_2$ as the spot LS first moves onto and subsequently fully onto the hole area applies for the values of x from $x = B$ to $x = B + S$, where B is the distance between the knife edge 43a and an imaginary line tangential to the facing side of the first row of holes 47 at position $x_{n_1}$. Considering the closely spaced hole zone between $x = B$ and $x = B + S$ as a filter having a generally constant density with an effective light transmission ratio $T_{H_{KEH}}$ of less than 1, and having a general knife edge formed by the first row of holes at line $x_{n_1}$, $\overline{T}_2$ may be generally approximated as $$\overline{T}_2 = (T_{KEH})(T_{H_{KEH}})$$

where $\overline{T}_{KEH}$ represents the approximate equation for translation for the spot LS over a knife edge transition zone from zero transmission into an adjoining zone of full transmission, and where $T_{H_{KEH}}$ represents the equation for the approximate transmission ratio of this initial hole filter zone, based on the assumption that the entire zone has a transmission ratio corresponding to some given interhole spacing, which for purposes of simplicity and practicality of computation is assumed to be equal to the interhole spacing of the first line of holes at $x_{n_1}$ closest adjacent to the knife edge 43a. The equation for $\overline{T}_{H_{KEH}}$ may be approximated generally as $$T_{H_{KEH}} = \frac{\pi H^2}{4(G_{x_n})^2}$$

and for the assumed value of $G_{x_n} = 2H$ $$T_{H_{KEH}} \cong \frac{\pi}{16}.$$

This value $\pi/16$ represents the transmission ratio modifier which is necessary in order to convert the knife edge equation $\overline{T}_{KEH}$ to the actual approximate curve for the situation where the transmission ratio beneath the knife edge is not unity, but is in fact $\overline{T}_{H_{KEH}}$, which is under the present assumptions approximately equal to $\pi/16$.

The generalized equation for the transmission ratio $\overline{T}_3$ along the remaining portion of the digital hole filter area 44 may be written as $$T_3 \cong \frac{\pi H^2}{4(G_{x_n})^2},$$

and is to be applied for values of $x$ from $x = B + S$ to $x \approx x_{n_{max}} + S$, assuming that the light spot LS may be translated over this total area, which of course may be modified as a total by effective lateral field limits imposed by the boundary of triangular field aperture 33.

Thus, the equation $\overline{T}_2$ and $\overline{T}_3$ combine to form the generalized approximate equation for the transmission ratio of the digital hole filter zone 44, and the combined transmission ratio curve for these generalized equations is indicated at $\overline{T}_2$ and $\overline{T}_3$ on the graph of FIG. 6, in which $\overline{T}_2$ represents the curve between values $x = B$ and $x = B + S$ and $\overline{T}_3$ represents the curve portion which extends between the values of $x = B + S$ to $x \approx x_{n_{max}} + S$.

Referring further to FIG. 6, it will be seen that the curve $\overline{T}_3$ drops off abruptly in the zone where $x \approx x_{N_{max}}$ where $x_{N_{max}}$ is the field cutoff boundary line effected by the lower edge of the triangular field aperture 33. In addition, it will be noted that in the zone between $x = 0$ and $x = B + S$, the combined average transmission ratio curve $T_1 + \overline{T}_2 + \overline{T}_3$ differs in varying amounts from the desired transmission ratio $T_x$. This variation may be tolerated for practical purposes, although it will be apparent that if so desired the hole spacing and/or the value of B may be modified to bring the curve in this portion into closer relationship to the desired transmission ratio curve $T_x$, this latter being capable of accomplishment by further trial and error computation, or by analogous computer programming if so desired. The curve $\overline{T}_3$ may be made to closely approximate the desired transmission ratio $T_x$ in the zone from $x = B + S$ to $x = x_{N_{max}}$ inasmuch as the interhole spacing may be adjusted from row to row as noted in the discussion above, although it wil be readily appreciated that this average value is in fact only average and that for any given position of the spot LS within this zone a degree of error may be present, as the filter system in this zone is in fact a positionally varying digital approximation of the desired analog curve.

As an illustration of a practical example which has been derived by repeated trial and error calculations according to the invention, a metal mask 41 has been derived and employed with a sheet thickness of 0.001 inch, and on which the diameter S of the light spot LS is 0.050 inch, the spacing $B = 0.0115$ inch, the hole size H of holes $47 = 0.001$ inch, and as a practical method of reliably forming and locating the upper apex edge zone of the triangular field cutoff aperture 33 such has been formed with a minute flat across the apex (e.g. $0.002 - 0.005$ inch) and this flat apex field stop at the apex of triangular field aperture 33 is disposed slightly below (e.g. $0.003 - 0.004$ inch) line $x_o$ (as discussed in connection with FIG. 5), thereby effectively shifting the beginning operational zone for values of $x$ in the approximation curve $T_1 + \overline{T}_2 + \overline{T}_3$, as noted schematically in FIG. 6, this being also somewhat desirable in view of the relative poor quality approximation of the curve $T_x$ in the zone adjacent $x_o$ with respect to theoretical zero position line $x_o$. In the specific illustrative value example this initial displacement and effective beginning operational zone has been located at $x = 0.003$ inch.

While the invention has been described with respect to a preferred physical embodiment constructed in accordance therewith, it will be apparent that various modifications and improvements may be made without departing from the scope and spirit of the invention. Accordingly, the invention is not to be limited by the particular illustrative embodiment, but only by the scope of the appended Claims.

That which is claimed is:

1. For use in a hit indicating arrangement having a movable target source of electromagnetic wave signal emanations, a selectively angularly aimable hit detector for detecting the aiming of said detector at said source within a selected zone indicating a scorable aimed hit, said hit detector being selectively angularly movable and comprising:

electromagnetic wave signal detection means, and a mask for said signal detection means, said mask forming a knife edge signal attenuating zone adjoining a signal passing zone, said mask having a further signal attenuating zone interspersed with spaced signal-passing apertures, and selectively angularly movable means for forming said signal emanations into a beam of discrete cross-sectional size substantially smaller at said mask than either of said signal attenuating zones, the lateral position of which beam at said mask is a function of the directional aiming of said hit indicator in the direction of and relative to said target.

2. A hit indicator according to claim 1, further comprising
threshold gate means responsive to the output from said detection means,
and indicating means operatively connected to the output of said threshold gate means,
said threshold gate means enabling indication operation of said indicating means upon the output of said detection means exceeding a selected quantum value.

3. A hit detector according to claim 1,
said signal attenuating zones comprising signal blocking zones.

4. A hit detector according to claim 1,
said spaced signal-passing apertures being disposed in rows of increasing inter-aperture spacing as a function the transverse distance of a row from said knife edge.

5. A hit detector according to claim 1,
the inter-row spacing increasing as a function of the transverse distance of a row from said knife edge.

6. A hit detector according to claim 4,
said apertures forming an envelope tapering outwardly in a transverse direction away from and normal to said knife edge.

7. A hit detector according to claim 5,
said knife edge being disposed in signal blocking relation at the medial section of said detector.

8. A hit detector according to claim 6,
said detector being of generally uniform response across its effective signal detector width as determined by the signal passing portions of said mask.

9. A hit detecting arrangement for a target having signal emanations therefrom comprising:
a detector responsive to said signal emanations,
mask means for said detector,
said mask means including a first signal passing section affording a first signal response curve, and a second different signal passing section affording a second modifying signal response curve,
one of said signal passing sections being formed by multiple discrete attenuation zones each of which has substantially the same unit value of total signal attenuation therepast, and which discrete signal attenuation zones are varied in spacing therebetween to effect a corresponding varied signal response curve by a signal beam traversed across said one signal passing section,
the signal output curve of said detector being a composite of said signal response curves,
and means selectively angularly movable relative to said target, for forming signal emanations from said target into a beam of discrete cross section substantially smaller at said mask means than either of said first or second signal passing sections,
and the said beam being movable across said mask means.

10. A hit detecting arrangement for a target having signal emanations therefrom comprising:
a detector responsive to said signal emanations,
mask means for said detector,
said mask means including a first signal passing section affording a first signal response curve, and a second different signal passing section affording a second modifying signal response curve,
the signal output curve of said detector being a composite of said signal response curves,
and means selectively angularly movable relative to said target, for forming signal emanations from said target into a beam of discrete cross section substantially smaller at said mask means than either of said first or second signal passing sections,
and the said beam being movable across said mask means,
said first signal passing section having an effective knife edge signal transmission attenuation transition zone with a first signal transmission zone on one lateral side of said signal transmission attenuation transition zone, and having a signal attenuation zone of greater signal attenuation effect than said signal transmission zone and disposed on the opposite side of said signal transmission attenuation transition zone, and
said second signal passing section comprising a plurality of spaced discrete signal passing zones of varying spacing across said second signal passing section as a general function of the spatial relationship of said spaced discrete zones to said knife edge transition zone,
and affording a second signal response curve differing and generally complementing said first signal response curve to generally simulate a desired total signal response curve.

11. A hit detector arrangement according to claim 10,
said second signal passing section including a signal attenuation pattern portion having a first signal transmission zone which has a signal attenuating characteristic, and an effectively generally knife edged signal attenuating portion of increased signal attenuation effect adjoining said first signal transmission zone and having a signal attenuating characteristic of greater signal attenuation effect than said first signal transmission zone.

12. A hit detector arrangement according to claim 11,
both of said knife edged attenuation portions being commonly adjoining and having oppositely facing effectively knife edged signal transmission transition zones spaced from one another.

13. A hit detecting arrangement for a target having signal emanations therefrom comprising:
a detector responsive to said signal emanations,
mask means for said detector,
said mask means including a first signal passing section affording a first signal response curve, and a second different signal passing section affording a second modifying signal response curve,
the signal output curve of said detector being a composite of said signal response curves,
and means selectively angularly movable relative to said target, for forming signal emanations from said target into a beam of discrete cross section substantially smaller at said mask means than either of said first or second signal passing sections,
and the said beam being movable across said mask means, said second signal passing section comprising substantially the same constant size light transmission zones and being of zonally varying light quantum transmissivity.

14. A hit detector arrangement according to claim 10,
said zonally varying light quantum transmissivity zones being formed by constant sized holes in said mask at varying spacing.

15. A hit detector arrangement according to claim 13,
said first signal passing section including an aperture bounded by a knife edge,
said knife edge being spaced from said varyingly spaced holes.

16. A hit detector arrangement comprising:
electromagnetic wave signal detection means,
and a mask for said signal detection means
said mask having a signal attenuating zone and a plurality of variably spaced apart substantially the same constant size signal passing zones of lesser attenuation than the total attenuation of said signal attenuating zone and being within said signal attenuating zone,
and selectively angularly movable means for selectively aiming at a target emanating electromagnetic signals, for forming an electromagnetic wave signal emanation from a said target into a beam of discrete cross-sectional size substantially smaller at said mask than the effective area of said signal attenuating zone and substantially larger than said signal passing zones and being of a size to overlap a plurality of said signal passing zones over a major portion of said signal attenuating zone.

17. A hit detector according to claim 17,
said signal passing lesser attenuating zones being apertures bordered by signal attenuating material which has greater signal attenuating characteristics than the signal attenuating characteristics across said apertures.

18. A hit detector according to claim 16,
said variably spaced lesser attenuation zones varying in inter-zone spacing as a function of the distance of sets thereof from a given point.

19. A hit detector according to claim 18,
said inter-zone spacing varying as an increasing function of increasing distance of sets of said lesser attenuating zones from a point.

20. A hit detector according to claim 16,
and a further mask fixed with respect to the first said mask and
having a further differential signal attenuating pattern formed thereon and having a signal passing zone aligned in signal passing relation with a portion of said signal attenuating and signal passing zones of lesser attenuation on the first said mask.

21. A selectively angularly movable photoscope arrangement comprising:
a photosensitive element,
and a digital gray scale mask disposed in the path of energy pickup by said photosensitive element,
and means for forming an energy beam of discrete cross-sectional size substantially smaller at said mask than the effective digital gray scale portion of said mask and for traversing said energy beam across said digital gray scale mask as a function of angular motion of said photoscope arrangement relative to a source of photo-energy from which a said energy beam may be formed,
said photosensitive element, digital gray scale mask, and last-named energy beam forming means being angularly movable as an aiming unit for selectively aiming thereof at a source of photo energy,
and means for restricting the lateral area from which said energy beam is formed, at any given directional position of the photoscope arrangement, to a restricted angle of view extending forwardly from said photosensitive element, digital gray scale mask and energy beam forming means.

22. A photoscope arrangement according to claim 21,
said digital gray scale mask including a knife edge photo transmission opening formed laterally adjacent a digital gray scale pattern.

23. A photoscope according to claim 21,
said digital gray scale mask comprising a photo transmissive element having spaced alternate zones thereon of differing photo transmissivity,
said zones being disposed in sets varying in set transmissivity as a function of the set distance from a selected spatial point laterally thereof.

24. A photoscope according to claim 23,
said digital gray scale mask including a knife edge photo transmission opening formed laterally adjacent a digital gray scale pattern formed by said spaced zones of one degree of photo transmissivity and other alternate intervening zones of a different degree of photo transmissivity,
said knife edge photo transmission opening being of substantially larger size than a plurality of said spaced zones of one degree of photo transmissivity.

25. A photoscope according to claim 21,
said digital gray scale mask comprising an element having a plurality of effective transmission zone holes formed therein at spaced intervals,
said holes being differently spaced from one another as a function of their position with respect to a particular given spatial point.

26. A photoscope according to claim 25,
said digital gray scale mask further having a knife edge photo transmission opening of substantially larger size than a plurality of said spaced holes and spaced to one lateral side of said holes.

27. A photoscope according to claim 26,
said particular given spatial point being disposed within said knife edge opening.

28. A photoscope according to claim 25,
said holes forming lines of spaced holes, the holes in said lines being differently spaced from the holes in other lines as a function of the lateral distance of said lines from a particular given spatial point.

29. A photoscope according to claim 28,
said digital gray scale mask further having a knife edge photo transmission opening of substantially larger size than a plurality of said spaced holes and spaced to one lateral side of said holes,
said particular given spatial point being disposed laterally beyond the effective knife edge formed by said knife edge opening.

30. A photoscope according to claim 29,
said digital gray scale mask comprising a planar sheet having said holes formed therein and extending therethrough.

31. A hit detecting arrangement comprising:

a target light signal source, means selectively angularly movable relative to said target light signal source for forming a signal from said light signal source into a correspondingly selectively angularly movable beam of discrete cross-section, and a photoscope for detecting signals from said target signal source when said photoscope is effectively directed at said target signal source, said photoscope comprising a photosensitive element and a digital gray scale mask disposed in the path of energy pickup by said photosensitive element from said beam forming means, said beam discrete cross-section at said mask being substantially smaller than the effective digital gray scale portion of said digital gray scale mask.

32. A hit detecting arrangement comprising:

a target light signal source, and a photoscope selectively angularly movable relative to said target light signal source for detecting signals from said target signal source when said photoscope is effectively directed at said target signal source, said photoscope comprising a photosensitive element and a digital gray scale mask selectively disposed in the path of energy pickup from said target light signal source by said photosensitive element and in sequential order along an imaginary longitudinal line extending through said hit detecting arrangement, and said digital gray scale mask including knife edge photo transmission opening formed laterally adjacent a digital gray scale pattern, means disposed in spaced relation from said photosensitive element and selectively angularly movable with said photosensitive element and digital gray scale element for forming a signal from said light signal source into a beam of discrete cross-section and thereby selectively aiming said beam toward said gray scale mask and said photosensitive element, and for effective beam alignment with said photosensitive element as a function of said selective aiming, said beam discrete cross-section at said mask being smaller than both said digital gray scale pattern and said knife edge photo transmission opening.

33. A hit detecting arrangement according to claim 32, and a field stop mask having a generally triangular field stop aperture formed thereon.

34. A hit detecting arrangement for a target having a signal emanating therefrom, comprising:

a detector for said target signal, and an analog simulating gray scale signal transmission attenuating unit disposed in signal path intercepting relation to said detector, said attenuating unit having a general gray scale signal transmission ratio which varies as a general function of transverse distance from a given zero spatial point, said attenuation unit comprising a signal passing section having multiple discrete attenuation zones each of which has substantially the same unit value of total attenuation therepast, and which discrete attenuation zones are varied in spacing therebetween to effect a corresponding varied signal response curve by a signal beam traversed across said section, and means selectively angularly movable relative to said target for forming said target signal into a signal beam of discrete cross-section substantially smaller at said mask than said digital gray scale transmission unit, which beam is movable laterally across said gray scale signal transmission attenuating unit as a function of lateral angular directional positioning and movement of said arrangement relative to the effective direction of emanation of a target signal from said target.

35. A hit detecting arrangement for a target having a signal emanating therefrom, comprising:

a detector for said target signal, and an analog simulating gray scale signal transmission attenuating unit disposed in signal path intercepting relation to said detector, said attenuating unit having a general gray scale signal transmission ratio which varies as a general function of transverse distance from a given zero spatial point, and means selectively angularly movable relative to said target for forming said target signal into a signal beam of discrete cross-section substantially smaller at said mask than said digital gray scale transmission unit, which beam is movable laterally across said gray scale signal transmission attenuating unit as a function of lateral angular directional positioning and movement of said arrangement relative to the effective direction of emanation of a target signal from said target, and a further field mask having a generally triangular field stop aperture zone, the apex of which is in close spatial coordinate relationship with said zero spatial point.

36. A hit detecting arrangement according to claim 35, said field mask being spaced from said gray scale signal attenuating unit.

37. A hit detecting arrangement according to claim 36, and an objective signal-gathering and converging means spaced from said field mask by a distance substantially equal to the focal length of said signal-gathering and converging means.

38. A hit detecting arrangement according to claim 37, and a signal-converging field lens disposed between said gray scale attenuating unit and said signal detector.

* * * * *

UNITED STATES PATENT AND TRADEMARK OFFICE
CERTIFICATE OF CORRECTION

PATENT NO. : 3,780,300
DATED : December 18, 1973
INVENTOR(S) : Michael A. Kott

It is certified that error appears in the above-identified patent and that said Letters Patent are hereby corrected as shown below:

Column 6, Line 43, After "$G_x$" insert ---1---, so the equation will read ---$G_{x_{min}} = G_{x_1}$---

Column 7, Line 54, After "$G_x$" insert ---$_n$--- so the equation will read ---$G_{x_n}$---

Column 7, Line 59, After "$G_x$" insert ---$_n$--- so the equation will read ---$G_{x_n}$---

Column 7, Line 66, Change the equation "$X_{n1}$" to read ---$X_{n_1}$---

Column 10, Line 17, Change "wil" to ---will---

Column 13, Line 35, Change "17" to ---16---

Signed and Sealed this

Twenty-sixth Day of May 1981

[SEAL]

Attest:

RENE D. TEGTMEYER

Attesting Officer    Acting Commissioner of Patents and Trademarks